United States Patent
Carey et al.

(10) Patent No.: US 9,648,502 B2
(45) Date of Patent: May 9, 2017

(54) SYSTEM FOR TAILORING WIRELESS COVERAGE TO A GEOGRAPHIC AREA

(71) Applicant: FIDELITY COMTECH, INC., Longmont, CO (US)

(72) Inventors: Joseph Carey, Longmont, CO (US); Robert Weaver, Boulder, CO (US); Russell Brinkman, Louisville, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 13/967,840

(22) Filed: Aug. 15, 2013

(65) Prior Publication Data

US 2014/0057638 A1 Feb. 27, 2014

Related U.S. Application Data

(60) Provisional application No. 61/683,562, filed on Aug. 15, 2012.

(51) Int. Cl.
*H04W 16/18* (2009.01)
*H04W 84/12* (2009.01)

(52) U.S. Cl.
CPC ............ *H04W 16/18* (2013.01); *H04W 84/12* (2013.01)

(58) Field of Classification Search
CPC .................................................. H04W 16/18
USPC ....................... 455/522, 562.1, 446
See application file for complete search history.

(56) References Cited

U.S. PATENT DOCUMENTS

| | | | |
|---|---|---|---|
| 5,771,439 A | 6/1998 | Kennedy, Jr. et al. | |
| 6,006,110 A | 12/1999 | Raleigh | |
| 6,181,276 B1 | 1/2001 | Schlekewey et al. | |
| 6,266,528 B1 | 7/2001 | Farzaneh | |
| 6,404,386 B1 | 6/2002 | Proctor, Jr. et al. | |
| 6,470,195 B1* | 10/2002 | Meyer ...................... | 455/562.1 |
| 6,509,872 B2 | 1/2003 | Ishii et al. | |
| 6,571,097 B1 | 5/2003 | Takai | |
| 6,920,192 B1 | 7/2005 | Laroia et al. | |
| 7,324,782 B1 | 1/2008 | Rudrapatna | |
| 7,340,277 B2 | 3/2008 | Nakamura | |
| 7,437,159 B1 | 10/2008 | Yarkosky et al. | |
| 7,522,552 B2 | 4/2009 | Fein et al. | |
| 7,525,486 B2 | 4/2009 | Shtrom et al. | |
| 7,528,789 B2 | 5/2009 | Gothard et al. | |
| 7,535,410 B2 | 5/2009 | Suzuki | |
| 7,609,648 B2 | 10/2009 | Hoffmann et al. | |
| 7,893,882 B2 | 2/2011 | Shtrom | |
| 7,916,810 B2 | 3/2011 | Tiirola et al. | |
| 8,040,278 B2 | 10/2011 | Maltsev et al. | |

(Continued)

OTHER PUBLICATIONS

WiMAX System Evaluation Methodology, Version 2.1, Jul. 7, 2008, WiMAX Forum.*

(Continued)

*Primary Examiner* — Vladimir Magloire
*Assistant Examiner* — David Orange
(74) *Attorney, Agent, or Firm* — Russell T. Manning; Marsh Fischmann & Breyfogle LLP

(57) ABSTRACT

Provided herein are systems and methods (i.e., utilities) that allow for synthesizing antenna patterns for wireless access points that provide coverage in a wireless network. The utilities utilize various mathematical models to identify antenna settings that enhance coverage of a coverage area.

9 Claims, 16 Drawing Sheets

(56) References Cited

U.S. PATENT DOCUMENTS

| | | |
|---|---|---|
| 8,085,206 B2 | 12/2011 | Shtrom |
| 8,217,843 B2 | 7/2012 | Shtrom et al. |
| 2002/0047800 A1 | 4/2002 | Proctor, Jr. et al. |
| 2002/0146983 A1* | 10/2002 | Scherzer ............... H04W 24/02 455/67.11 |
| 2004/0114535 A1 | 6/2004 | Hoffmann et al. |
| 2006/0262768 A1* | 11/2006 | Putzolu .......................... 370/344 |
| 2007/0205943 A1 | 9/2007 | Nassiri-Toussi et al. |
| 2008/0102881 A1* | 5/2008 | Han et al. ...................... 455/522 |
| 2011/0242996 A1* | 10/2011 | Zhu et al. ...................... 370/252 |

OTHER PUBLICATIONS

Beamforming Techniques for User Capacity Improvement of IS-95 Cellular CDMA Systems, Lester Kwok-Hung Chan, Jun. 2002 (Master's thesis from the University of British Columbia).*

* cited by examiner

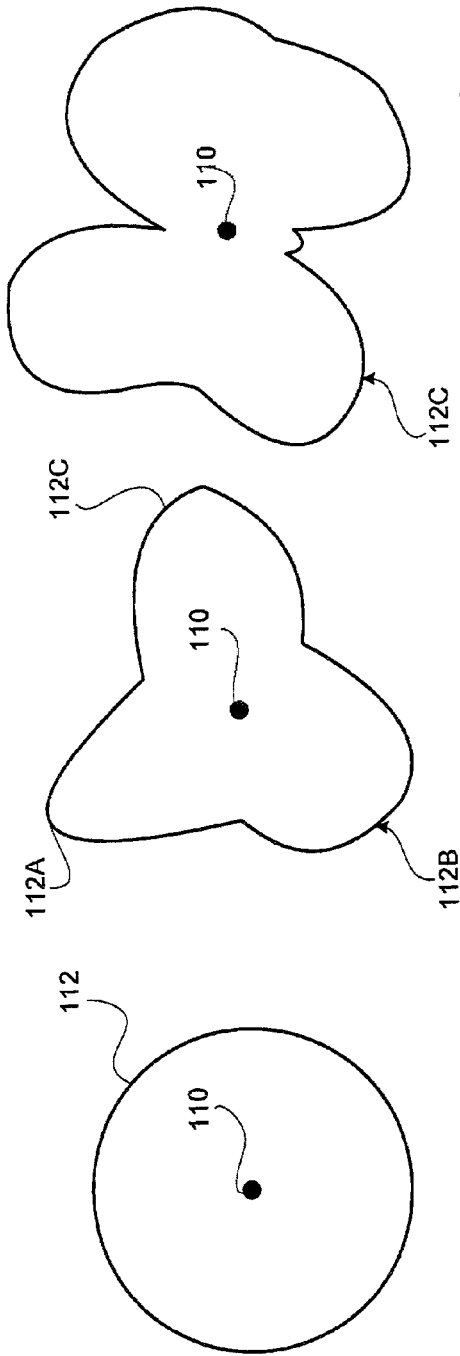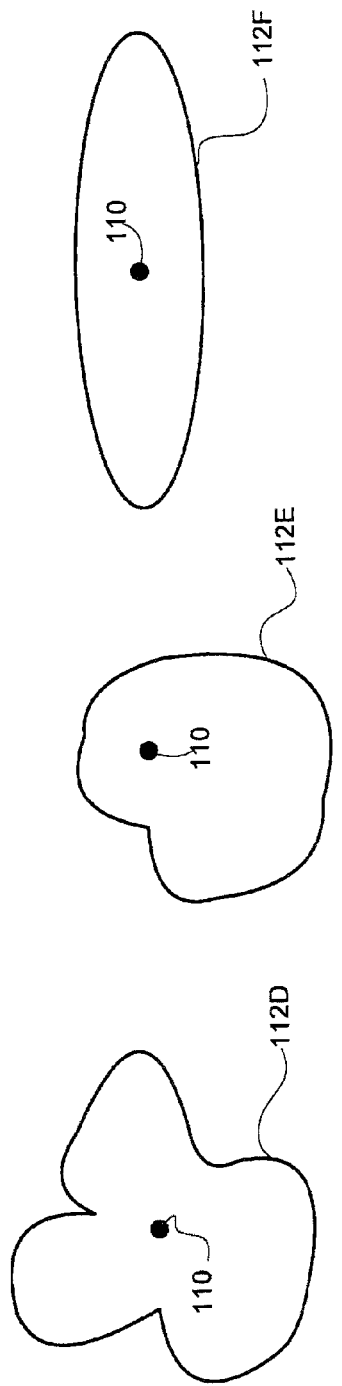

220B

|  |  | 1.0 ● | 0.8 |
|---|---|---|---|
| + | + | + | + |
|  |  | 0.3 | 0.25 |
| + | + | 0.7 + 0.4 | 0.65 + 0.33 |
| 2,1 + | 2,2 + | 2,3 0.6 + 0.5 | 2,4 0.55 + 0.37 |
| 1,1 ● + 1.0 | 1,2 + 0.7 | 1,3 0.5 + 0.6 | 1,4 0.45 + 0.4 |

SYSTEM FOR TAILORING WIRELESS COVERAGE TO A GEOGRAPHIC AREA

CROSS-REFERENCE

The present application claims the benefit of the filing date of U.S. Provisional Patent Application No. 61/683,562 having a filing date of Aug. 15, 2012, the entire contents of which is incorporated herein by reference.

FIELD

Systems and methods are described that allow for synthesizing coverage patterns of one or more adaptive antennas of a wireless network to a geographic coverage area.

BACKGROUND

Wireless network operators often desire to provide coverage over a well defined geographic area. Key to providing that coverage is ensuring good signal strength is available everywhere in that area. However, it would be a mistake to cover the area outside the desired geography as it is both wasteful of resources and potentially allows interference from outside the region to enter the network.

Historically, a network operator has had a selection of standard antennas for their base stations or wireless access point. For example, they might choose to use an omnidirectional antenna, a 90 degree sector, or a 120 degree sector. Each of these antennas is manufactured with dimensions to achieve the desired radiation pattern. Due to the nature of production line manufacturing, it is infeasible to manufacture unique antennas for each antenna site.

Furthermore, limited locations may be available to mount the antennas for a base station or wireless access point. For example, it may be desirable to use light poles to mount access points due to their height, but those light poles may not be in the best locations to provide wireless coverage. As such, it is often the case that the limited supply of antennas does not do an especially good job of covering an area of interest given the antenna locations that are available.

In contrast with traditional passive antennas, adaptive antennas are capable of creating a wide variety of patterns through software configuration. For instance, a phased array antenna's radiation pattern is determined by the "weights" that are programmed into the antenna (signal magnitudes and phases), along with physical parameters such as antenna element geometry and spacing. One example of a commercial phased array antenna is Fidelity Comtech's Phocus Array System.

The process of determining the set of weights (e.g., beamformer weights) that will produce a desired pattern is referred to as "pattern synthesis." Historically, the pattern synthesis problem has been solved assuming there is a well defined radiation pattern that is desired of the antenna. The weights are then adjusted to attempt to mimic the defined radiation pattern. Occasionally, when there is an interfering signal that is jamming the desired signal, the weights are determined such that the ratio of the desired signal to undesired signal is minimized.

SUMMARY

The inventions described herein allow the network operator to describe the area where coverage is desired (the "Area of Interest"; AoI or coverage area). The AoI could be a large area being covered by multiple "cells," or a single cell. The operator also defines the location and orientation for each antenna providing coverage for the AoI. The inventive processes described herein then produce a set of antenna adjustments (e.g., weights) that can be programmed into each antenna which produce improved network performance compared with standard passive (i.e. not reconfigurable) antennas. That is, patterns are synthesized for each antenna/access point to provide enhanced coverage, enhanced data transfer and/or reduced interference for the AoI.

One objective of the process is to increase or maximize the probability that a packet transmitted anywhere in the area of interest can be successfully received by at least one of the antennas that have been defined. Another objective is to increase or maximize the data capacity of the area of interest. One problem addressed herein is determining both the antenna radiation pattern and the set of weights that produce it, given a geographic boundary where wireless coverage is needed, a set of antenna locations and the orientation of those antennas.

Once programmed into an adaptive antenna, the resulting antenna patterns provide better coverage for their individual coverage areas and the area of interest as a whole. This, results in fewer dropped packets and/or enhanced data transfer rates in comparison with standard passive antennas, such as the omnidirectional or sector antennas described above.

To achieve this, several mathematical models are variously used, alone and/or in combination, that describe the network as a system:

1. A mathematical model of signal propagation loss versus distance between transmitters and receivers. This model may be determined either based on measured data, or theoretical propagation. In the latter regard, no feedback is required from the network to synthesize the antenna patterns.
2. A model describing the Area of Interest and antenna locations. The AoI is divided into a number of grid cells. The grid cell size is at least several wavelengths on a side, but typically not more than a few hundred wavelengths. The model includes the antenna locations, height and orientations.
3. A model of the mobile device transmitter, specifically, the effective isotropic radiated power of the client device. The effective isotropic radiated power is the product of the antenna gain and the transmit power.
4. A mathematical model describing a network performance criteria of the network. In one arrangement, the network performance criteria relates to a probability of a packet being successfully received as a function of signal strength. In another arrangement, the network performance criteria relates to a data capacity of the network. This model may be derived based on theoretical foundations, such as the Eb/No curve of a particular waveform, or empirical evidence (i.e. experiment).
5. A mathematical model that describes the radiation pattern of the adaptive antenna as a function of the beamformer weights. The radiation pattern of the adaptive antenna may be expressed as a function in azimuth and/or elevation.

It should be recognized that the mathematical model of propagation loss can be developed in any of several ways, and hybrid approaches are possible. In particular:

1. In one case, the path loss may be computed based on free space path loss.
2. An equation describing path loss from areas with similar topographies may be used.

3. The path loss at each grid cell location may be measured in an operating network In a more sophisticated variant, the path loss may be measured at many locations, used to develop an equation describing path loss as a function of distance, and then the results of that equation may be used to estimate the path loss in those grid cells where measurements were not taken.

From models 1, 2 and 3, a new model may be generated that describes the Area of Interest. The new model contains the following:
1. For each grid cell, a distance between each grid cell and each antenna and the path loss to every antenna
2. For each grid cell, the bearing angle from every antenna to that grid cell.

Using this new model that describes the AoI, a "steepest descent" optimization algorithm is described for determining the optimum beamformer weights of each adaptive antenna. It should be understood that this could be replaced with any other optimization algorithm, including, for example, a genetic algorithm.

The process follows the following iterative procedure:
1. Pick a seed value for the beamformer weights in each antenna. That value could be the weights that produce an omnidirectional pattern, or any other weights for which there is reason to believe is close to being suited to providing good coverage.
2. Compute an overall network performance criteria for the network, which may include one or more access points/antennas. This may entail computing an overall probability that a packet will successfully get through the wireless network from any location in the network and/or computing an overall data capacity of the wireless network. To do this:
   a. For each grid location:
      i. Compute the Signal to Noise Ratio of the signal received at each antenna (this is determined by path loss between mobile and phased array, mobile device EIRP and phased array antenna gain in the direction of the grid cell).
      ii. Given the SNR computed above and the performance criterion model (e.g., model for probability of successful transmission and/or model for data capacity), compute the probability that the signal from this grid cell will be successfully received by each adaptive antenna and/or compute the data capacity of each grid cell.
      iii. If based on probability of successful receipt in a multiple access point configuration, compute the probability that the packet will fail to get through from this grid location through each antenna (1-probability of success for that antenna).
      iv. If based on probability of successful receipt in a multiple access point configuration, compute the probability that the packet will fail to get through on any antenna (the product of the individual probabilities that it will fail to get through on each antenna).
      v. If based on probability of successful receipt in a multiple access point configuration, compute the probability that the packet will succeed in getting through. This is (1-probability that the packet will fail to get through on any antenna)
   b. Compute the aggregate probability that the packet could be successfully transmitted from any grid location in the network and/or compute the overall data capacity of the network. This is equal to the product of the probability of success and/or data capacity for each cell location. Alternatively, this can be computed as either the sum of the logarithm of the probability of successful transmission and/or data capacity from any location or the mean of the logarithm of the probability of successful transmission and/or data capacity from any location.
3. For each antenna array:
   a. For each antenna element:
      i. Increase the phase of the beamformer weight applied to this element, on this antenna array. A typical value of phase change would be between 10 and 45 degrees, but any change is possible. Compute the overall probability of network success and/or data capacity for this variation (as described above in step #2). Record the result.
      ii. Decrease the phase of the beamformer weight applied to this element, on this antenna array. This phase change may be equal to the one selected in step 3.a.i. Compute the overall probability of success and/or data capacity for this variation. Record the result.
   b. Once each antenna element in an array has been varied, review the recorded probabilities of success and/or data capacities and determine which one had the most favorable impact; select this variation for the current beamformer weights for the current antenna. It is possible no phase variation will result in better performance than the original beamformer weights. A further improvement may be to apply Newton's method.
   c. Optionally, examine the effect of varying magnitude. Not all phased arrays will allow for this, and varying magnitude will frequently not improve performance. Nonetheless, in some circumstances, it may improve performance. For each antenna element in this array:
      i. Increase the magnitude of this antenna element by some amount, on the order of 10%. Scale the magnitude of the entire beamformer so that the maximum magnitude of any element is 100%. Compute the overall probability of success and/or data capacity for this variation and record the result.
      ii. Reduce the magnitude of this antenna element by the same amount as above and scale so that the maximum magnitude of any element is 100%. Compute the overall probability of success and/or data capacity for this variation. Record the result.
   d. Again, once the magnitude of each element has been varied, review the recorded overall network probability of success and/or data capacity and determine which had the most favorable impact. Select this as the variation of the current beamformer weights for this array.
4. If any of the variations in beamformer weights for this array resulted in performance improvement, select the variation that produced the most favorable result as the new weight for future computations.
5. Repeat the above process for each array in the network.
6. Repeat steps two through 5, above, until no variations on any antenna result in a materially improved overall probability of success and/or data capacity for the network.
7. Convert the beamformer weights to a format that can be uploaded into an adaptive antenna.
8. Upload the beamformer weights into the appropriate antennas.

One or more of the above-noted models may be utilized to synthesize antenna patterns individually and or collectively for an coverage area/area of interest.

BRIEF DESCRIPTION OF THE DRAWINGS

FIGS. 2A-2F illustrate exemplary beam patterns for adaptive antennas.

FIG. 12 illustrate calculation of probability of successful transmission for a grid having multiple access points.

DETAILED DESCRIPTION

The present invention is based in part on the realization that the coverage needs of a wireless network are typically non-uniform. In this regard, geographic variations of a desired coverage area of one or more access points (e.g., base station, cell tower, etc.) typically do not match the radiation patterns of the antennas of the access points. In this regard, significant resources are expended (e.g., coverage signals) to areas outside of the desired coverage area. Thus, the provision of a uniform signal (e.g., an omni-directional signal) from an access point to a coverage area may, in many instances, not provide the most efficient use of the access point. Further, it has been recognized that utilization of adaptive antenna systems may allow for varying the coverage pattern within a particular coverage area. For instance, utilization of an adaptive antenna and in one specific embodiment, a phased array allows adapting an antenna beam pattern (e.g., synthesizing a beam pattern) to a given area.

Currently, no process or application exists today to allow for automatically adapting the beam patterns of multiple adaptive antennas to a desired coverage area. That is, adapting the beam patterns typically requires a laborious trial and error method of individually adjusting each antenna to attempt to generate coverage within the coverage area that has at least a minimum signal strength at all or most locations within the coverage area. That is, network operators currently use a trial and error process to manually adjust coverage as the environment of a particular coverage area. The use of adaptive antenna configuration systems and methods (i.e., utilities) as proposed herein, may automate the process of adjusting coverage of one or multiple adaptive antennas to a desired coverage area. This significantly reduces the time and expense required, compared with using the manual trial and error process. The utilities may be utilized to configure any of a number different wireless networks that may utilize standard or proprietary protocols, including, but not limited to: IEEE 802.11, LTE and WiMax. In once specific arrangement, the adaptive antenna systems utilize a phased array (e.g., Phocus Array) as set forth in U.S. Pat. No. 6,894,657 ("bi-directional vector modulator"), the entire disclosure of which is incorporated herein by reference.

Figure 1A:
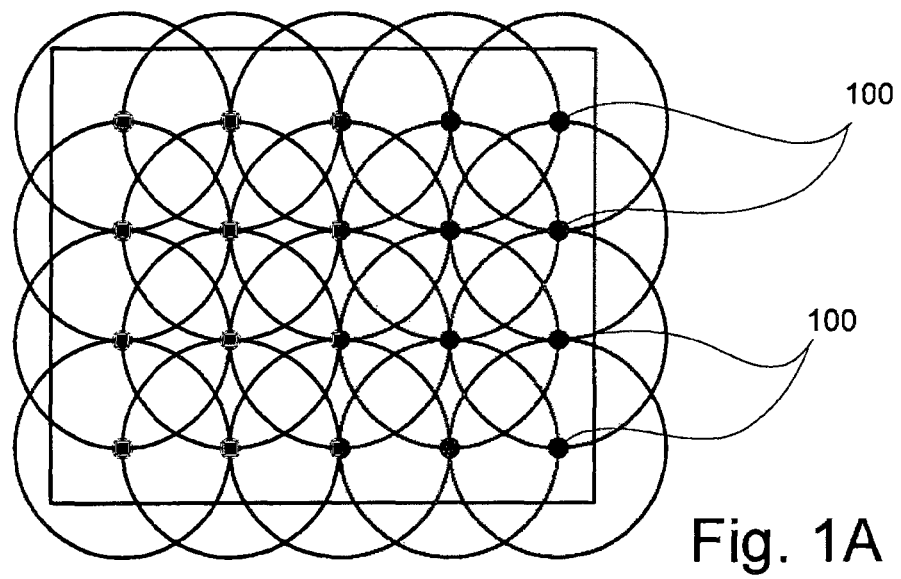
FIG. 1A illustrates a wireless coverage network using omni-directional antennas.
Figure 1B:
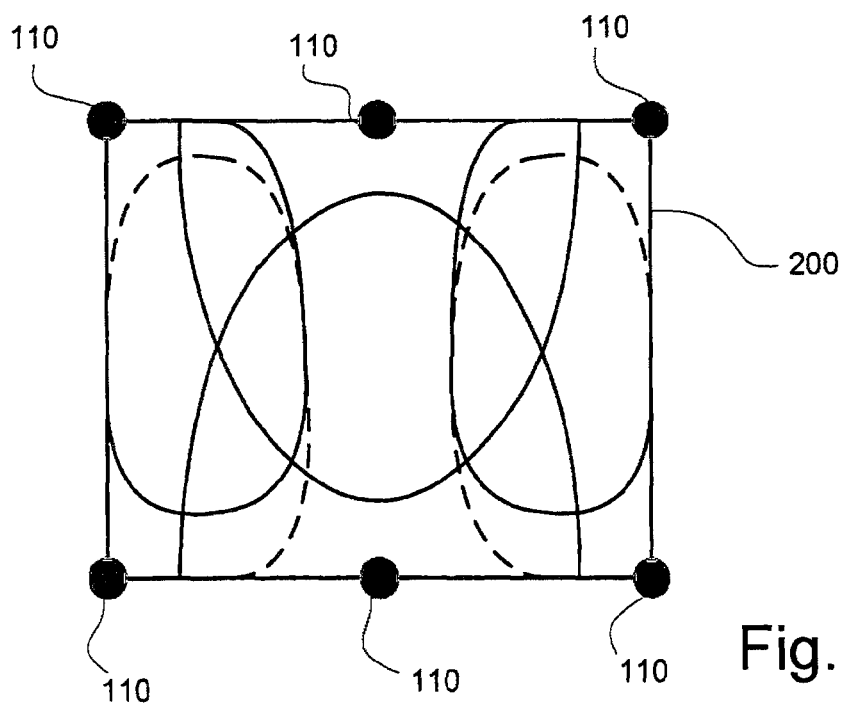
FIG. 1B illustrates a wireless coverage network using adaptive antennas.

Conventionally, large-scale wireless enterprise networks utilize a large number of access points that necessarily results in high up front infrastructure and equipment costs. Typically, each access point requires a pole or other consideration for mounting the wireless access point above the ground. Such a conventional antenna arrangement is set forth in FIG. 1A. As shown, a multitude of access points 100 provide overlapping coverage to all areas within a coverage area 200, which in the present embodiment is represented by a rectangle. However, it will be appreciated that such coverage areas are not so limited. As illustrated in FIG. 1B, the use of a phased array 110 allows for providing coverage to the coverage area 200 utilizing significantly fewer access points. In the present embodiment, coverage in the illustration of FIG. 1B is provided by six (6) phased arrays 110. This contrasts with the use of twenty access points 100 as illustrated in FIG. 1A. That is, the use of adaptive antenna allows altering coverage by tailoring control of the RF beam of each array in desired coverage areas. There are a number of advantages inherent in this approach. For instance, beam shaping of a phased array provides greater coverage per access point resulting in far fewer antenna arrays necessary to provide complete coverage for an area and thus reduces upfront system acquisition and set-up costs. Further, interference and multi-path issues are dramatically reduced by use of such phased arrays. Finally, and without limitation, maintenance and lifecycle costs are dramatically reduced due to the simplicity of the equipment architecture.

Figure 3:
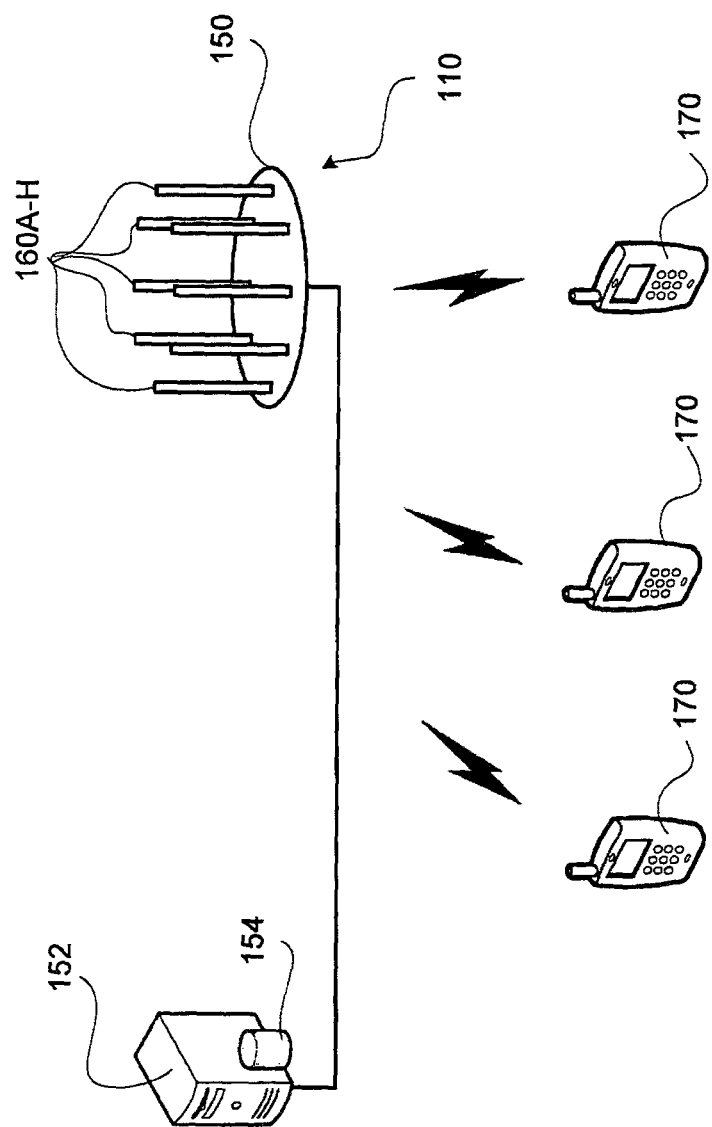
FIG. 3 illustrates an exemplary adaptive antenna.

FIGS. 2A through 2F illustrate exemplary radiation patterns that may be generated utilizing an adaptive antenna such as a phased array. As illustrated, initially, a radiation pattern 112 of an access point 110 may be nearly circular. In this regard a circular phased array 150 as illustrated in FIG. 3 having equal phase and magnitude weights on each of its antenna elements may generate a substantially circular radiation pattern 112. By adjusting the phase and/or magnitude of the signal to each antenna element of the circular array 150, it is possible to provide altered radiation patterns 112. For instance, as shown in FIG. 2B, it is possible to provide a radiation pattern having, for example, three lobes 112A-C. Other non-limiting variations are illustrated in FIGS. 2C-2F.

The system is variously comprised of several major components. See FIG. 3. Specifically, the system includes one or more base stations or access points 110, each with an adaptive antenna or antennas 150. A processor or server 152 communicates with the access points 110 and a database 154. This processor or server 152 may be located at an access point 110 or remotely. The database 154 may store both current information and historic results. Finally, one or more mobile devices or clients 170 may communicate with the access point(s) 110. These clients may be vehicular devices, mobile phones, tablets etc. The access point may 110 support any of a number of standard or proprietary protocols, including, but not limited to: IEEE 802.11, LTE and WiMax.

The adaptive antenna may be of any of a variety of types. The illustration shows a particular type of electronic adaptive antenna 150, a phased array. A phased array adjusts its antenna pattern by reconfiguring a set of "signal weights"—magnitude and phases on multiple elements 160A-H. The adaptive antenna could be a different type of electronic device or could also be made of a set of mechanically adjustable components. The 'circular' phased array 150 as illustrated in FIG. 3 may generate a substantially circular coverage area 112 (see FIG. 2A) when each of its antenna elements 160A-H have equal phase and magnitude weights. By adjusting the phase and/or magnitude of the signal to each antenna element of the circular array 150, it is possible to provide altered radiation patterns as variously illustrated in FIGS. 2B-2F. For instance, as shown in FIG. 2B, it is possible to provide a radiation pattern having, for example, three lobes 112A-C.

In the illustrated embodiment, the adaptive antenna 150 is defined by eight antenna elements 160A-H disposed in a circular array. Each of the antenna elements is typically disposed in front of a reflector (not shown). A control and processing system of the antenna or server/processor 152 are coupled to each of the antenna elements and is adapted to adjust the signal (e.g., phase and/or magnitude) applied to each antenna element to produce a beam pattern.

As shown, the antenna elements 160a-h of the antenna 150 are arranged in a pattern of a regular convex polygon where an antenna element is disposed at each vertex of the polygon. For example, an array having eight equally spaced antenna elements would define a regular octagon. However it will be appreciated that other numbers of elements are possible and are considered within the scope of the present invention. Thus, such arrays may define hexagonal arrays. Further square, triangular etc. arrays could also be used. The directional antennas may be formed by any type of antenna element, including a patch or reflector. The antenna beams of the directional antenna elements typically overlap, so that from any azimuthal direction, the point is covered by more than one antenna beam.

While providing significant improvements over standard/conventional antennas, a difficulty exists in determining the appropriate beam pattern for each adaptive antenna. This difficulty increases when multiple antennas are utilized to provide coverage and when a coverage area is non-uniform, which is the most common situation in the real world. In this latter regard, it is noted that FIGS. 1A and 1B illustrate an idealized situation where a coverage area is geometrically uniform and access points may be placed at any desired location in the coverage area. In most real world situations, the coverage area is not geometrically uniform nor can network providers place access points at will. Rather, network providers are often limited in where they can place access points due to, among other things, geography and/or private property rights (e.g., limited access to desired locations).

Figure 4:
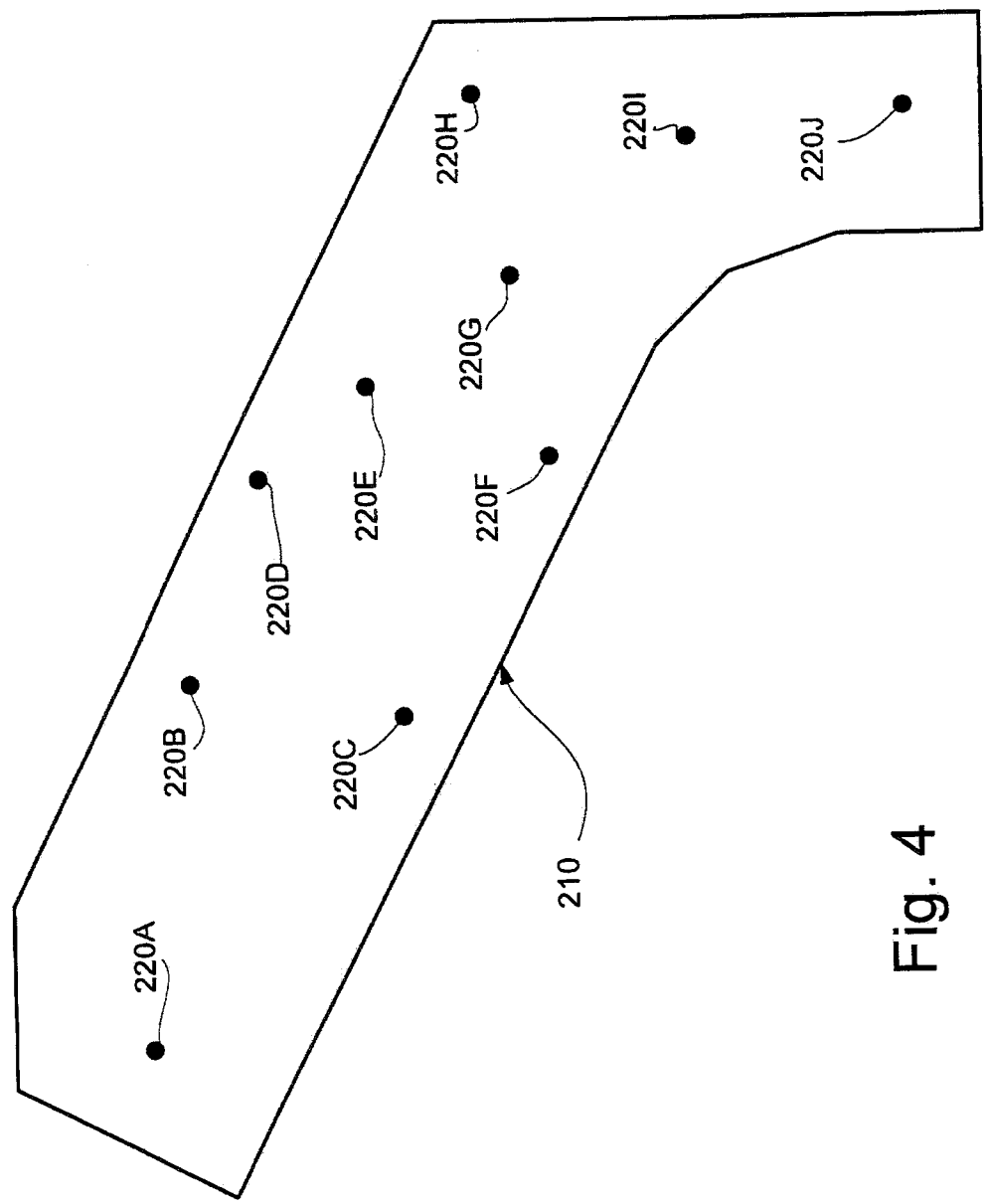
FIG. 4 illustrates an exemplary coverage area.

FIG. 4 illustrates one exemplary situation where Wi-Fi network coverage is desired for a non-geographically uniform coverage area 210. Further, limited locations exist within the coverage area 210 where access points 220A-J (hereafter 220 unless specifically identified) may be provided for the Wi-Fi network. For instance, the location of the access points 220 may coincide with existing structures that are available within the coverage area 210. Commonly, such existing structures include existing light poles or other elevated structures onto which an adaptive antenna may be mounted without this necessitating the placement of a dedicated pole or tower.

Figure 5:
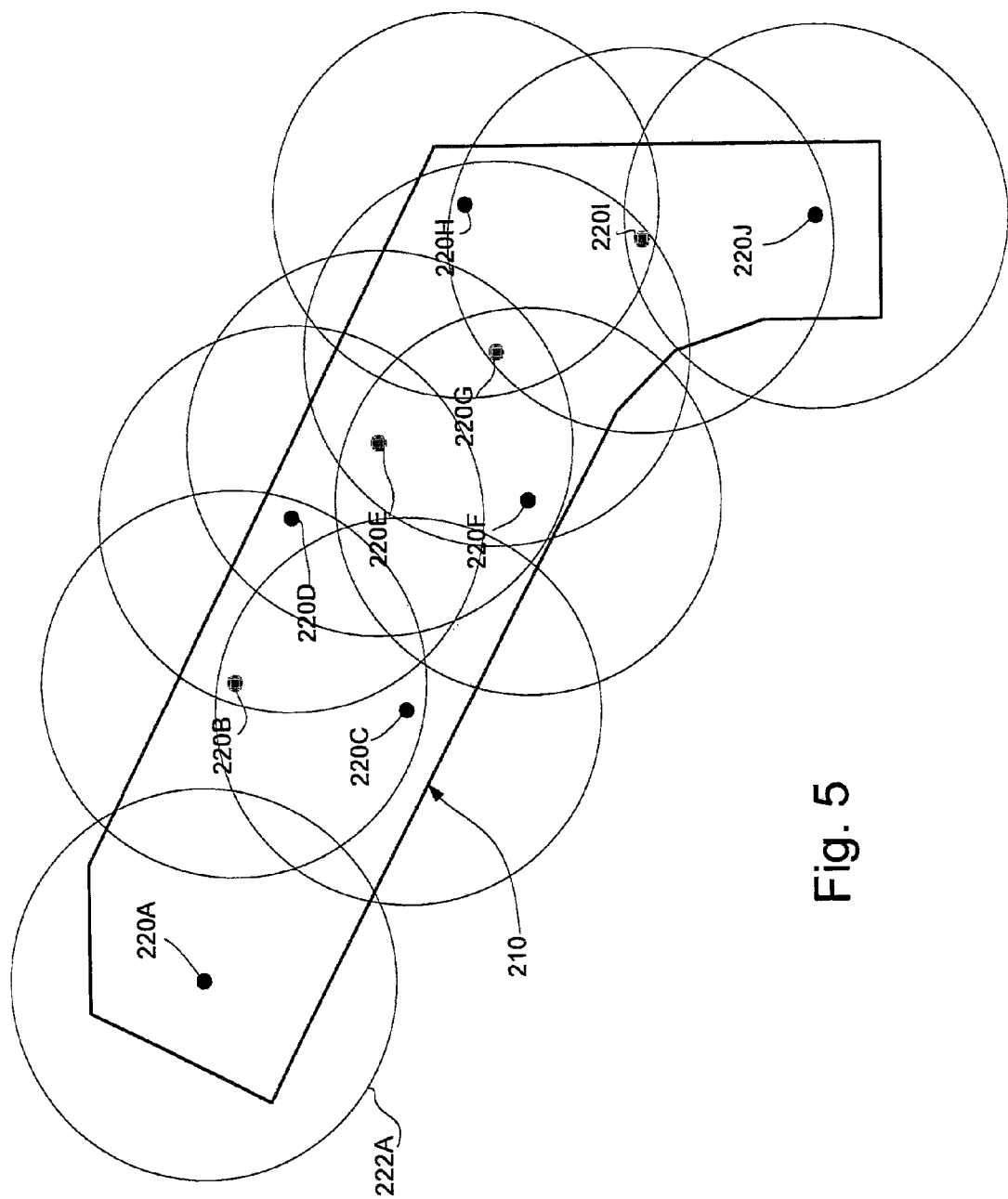
FIG. 5 illustrates the exemplary coverage area of FIG. 4 using omni-directional antennas.

FIG. 5 illustrates the coverage area 210 of FIG. 4 were each of the access points 220 utilizes an omnidirectional antenna to provide coverage for the coverage area. As shown, the omnidirectional antennas provide a generally circular beam pattern 222. Further, it will be noted that such beam patterns result in significant coverage outside of the boundaries of the coverage area 210 and overlap between the coverage areas of adjacent access points, which may result in unnecessary interference. Key to providing coverage within the coverage area 210 is ensuring good signal strength (e.g., signal to noise ratio; SNR) is available everywhere in the area 210. However, covering areas outside the desired coverage area is both wasteful of resources and potentially allows interference from adjacent access points and/or from outside the coverage area. In relation to interference, it is noted that a Signal to Interference plus Noise Ratio is calculated as SINR=P/(I+N) where P is signal power, I is interference power and N is noise power. The presence of overlapping coverage areas results in an increase in the interference (I) and thereby lowers the signal to noise ratio of a signal, which in its basic form is calculated as signal power divided by noise. Reducing the overlap of adjacent coverage areas, as provided herein, works to reduce such interference and thereby provides improves signal to noise ratio and/or data capacity.

Figure 6:
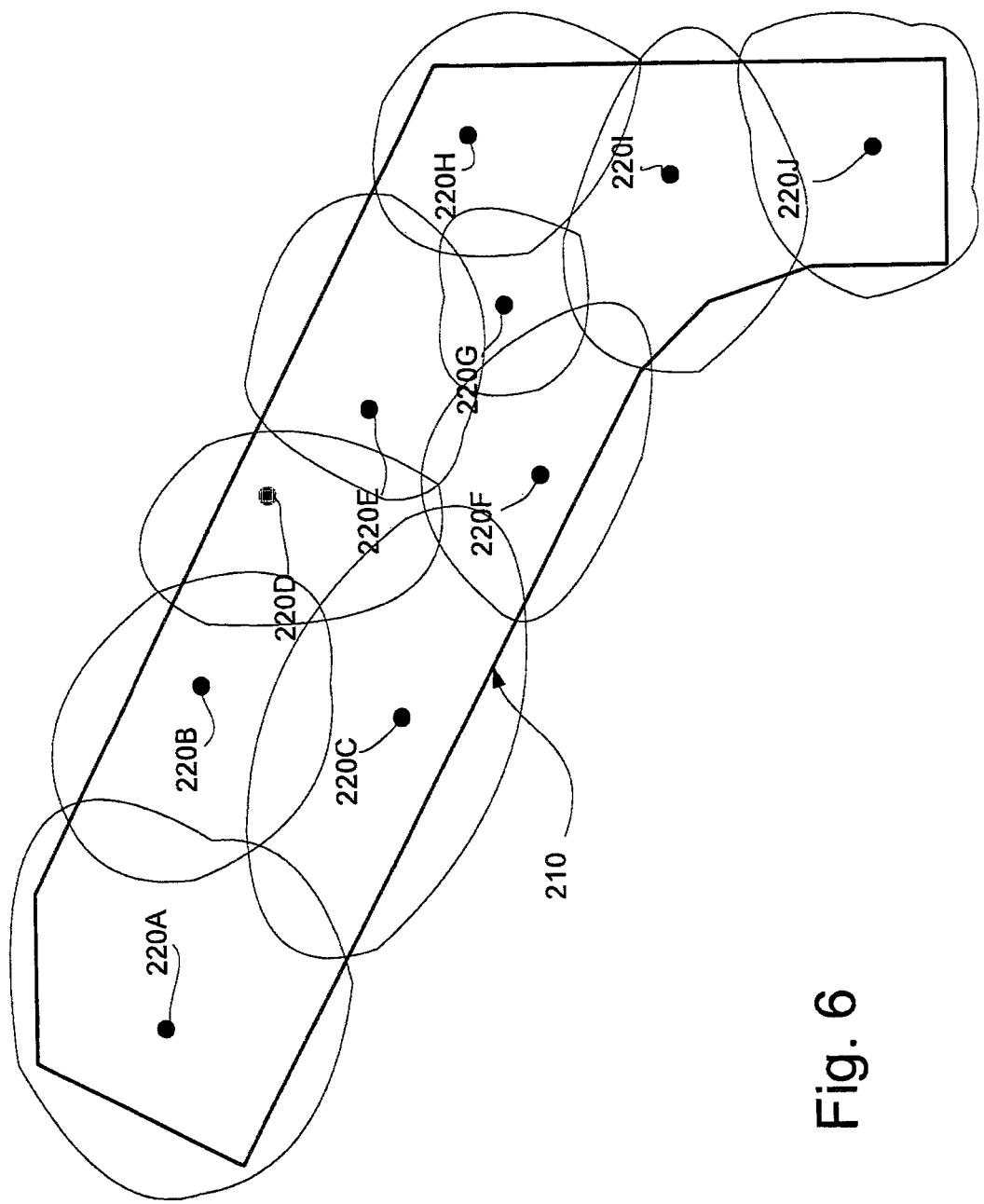
FIG. 6 illustrates the exemplary coverage area of FIG. 4 using adaptive antennas.

It is desirable to utilize adaptive antennas to better conform the beam patterns of each of the access points 220 the coverage area 210. FIG. 6 illustrates an exemplary embodiment where the beam patterns of each of the access points 220 have been synthesized to better conform to the boundaries of the coverage area 210 while providing full coverage within the area. As shown, by individually synthesizing the patterns of each of the access points 220, the coverage overlap and interference between adjacent access points is reduced. Likewise, the amount of coverage outside the boundaries of the coverage area 210 is significantly reduced. Further, by reducing the amount of coverage outside the coverage area 210, additional signal strength may be provided to the areas covered by the beam patterns of each of the individual access points 220. That is, better signal-to-noise ratios and higher data transfer rates may be achieved for mobile devices within the coverage area 210.

While simple in concept, it will be appreciated that synthesizing each of the antennas of each of the access points 220 to provide adequate coverage for all locations within the coverage area is a complex task. That is, previously trial and error methods have been utilized to manually adjust each beam pattern. This is resulted in a cumbersome and slow process of adjusting multiple beam patterns to provide coverage for a desired coverage area. What is needed is a system and method that allows for generating an initial estimate of a best fit solution for multiple individual adaptive antennas. That is, a system and method for optimizing the coverage of multiple antennas is needed.

Configuration System and Method

Provided herein is a computer implemented utility that allows for calculating antenna patterns for adaptive antennas to tailor the overall coverage of one or more adaptive antennas to a specific coverage area. That is, the utility allows for synthesizing individual antenna patterns, which may be based, in part, on the antenna patterns of one or more adjacent/neighboring antenna patterns. While the aspects described herein are in the general context of computer-executable instructions of computer programs and software that run on computers (e.g., personal computers, servers, networked computers etc.), those skilled in the art will recognize that the invention also can be implemented in combination with other program modules, firmware and hardware. Generally, program modules include routines, programs, components, data structures, etc. that perform particular tasks or implement particular abstract data types. Moreover, those skilled in the art will appreciate that the invention can be practiced with other computer configurations.

One objective of the utility is to enhance or maximize the probability that a packet transmitted anywhere within an area of interest/coverage area can be successfully received by at least one of the antennas providing coverage for the area. Another objective is to enhance or maximize the data capacity of the coverage area. These objectives may each be addressed by both determining antenna radiation patterns and the sets of weights that produce the patterns, given a geographic boundary where wireless coverage is needed and based on a set of antenna locations and the orientation of those antennas.

To achieve this, several mathematical models are used:
1. A mathematical model of signal propagation loss versus distance between the transmitter (e.g., antenna) and receiver (mobile device). This model may be determined either based on measured data, or theoretical propagation.
2. A model describing the Area of Interest and Antenna locations. The AoI is divided into a number of grid cells. The grid cell size is at least several wavelengths on a side, but typically not more than a few hundred wavelengths. The model includes the antenna locations, height and orientations.
3. A model of the mobile device transmitter, specifically, the effective isotropic radiated power of the client device. The effective isotropic radiated power is the product of the antenna gain and the transmit power.
4. A mathematical model describing one or more network performance criteria of the network. In one arrangement, the network performance criteria relates to a probability of a packet being successfully received as a function of signal strength. In another arrangement, the network performance criteria relates to the data capacity of the network as a function of signal strength. These models may be derived based on theoretical foundations, such as the Eb/No curve of a particular waveform, or empirical evidence (i.e. experiment).
5. A mathematical model that describes the radiation pattern of the phased array antenna as a function of the beamformer weights. The radiation pattern of the phased array will be expressed as a function in azimuth and possibly elevation.

Figure 7:
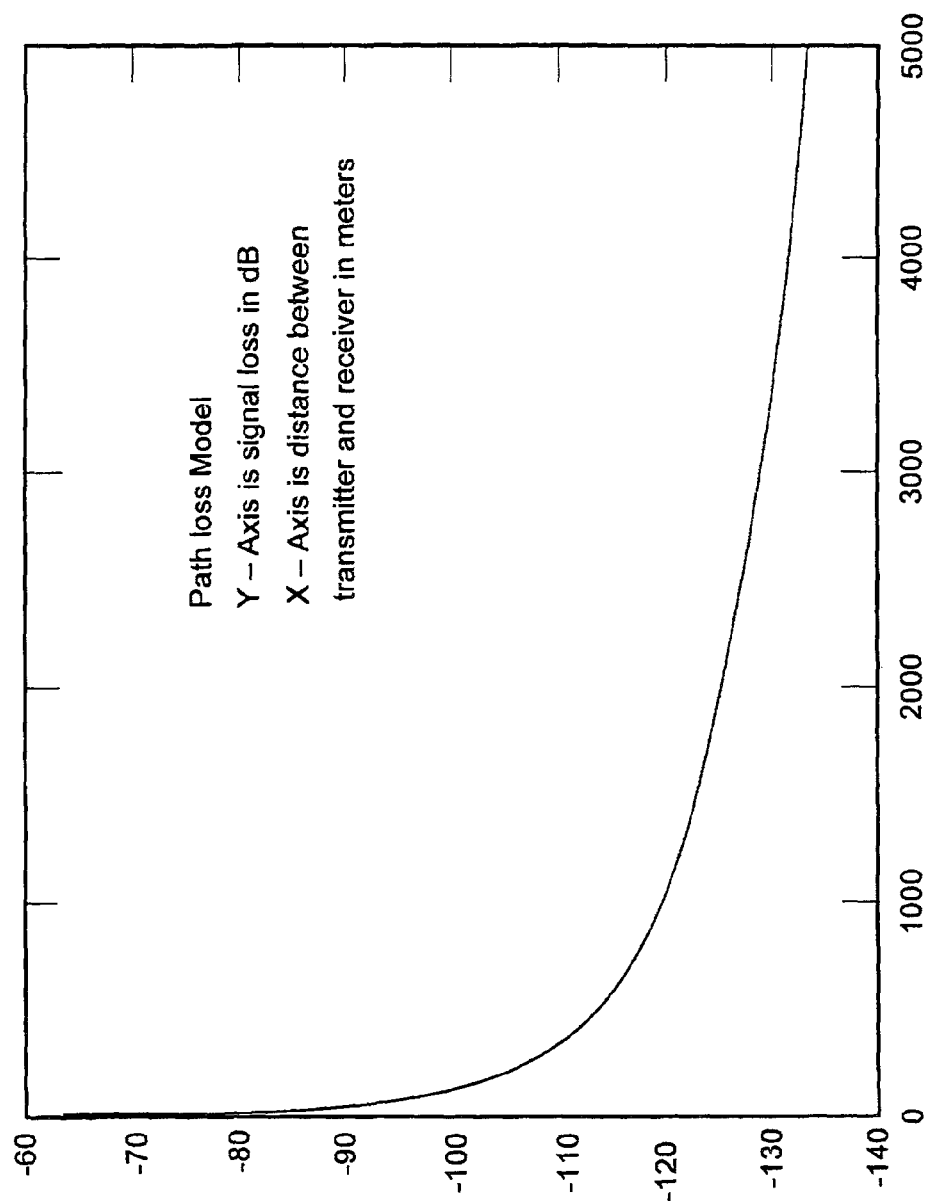
FIG. 7 illustrates a path loss model.

In relation to the first model, it is a general rule that the path loss of a signal increases as a function of distance between transmitter and receiver; because the path loss is expressed as a gain (e.g. $G_{PL}$), the gain value becomes smaller with increasing distance, or, when expressed as a decibel number, more negative. This is illustrated in the model of FIG. 7, which shows the attenuation of a free space signal increasing over distance. It will be appreciated that the curve illustrated in FIG. 7 may be defined by a mathematical equation or look-up table such that if a distance between a transmitter and receiver is known, an expected path loss may be determined.

Figure 8:
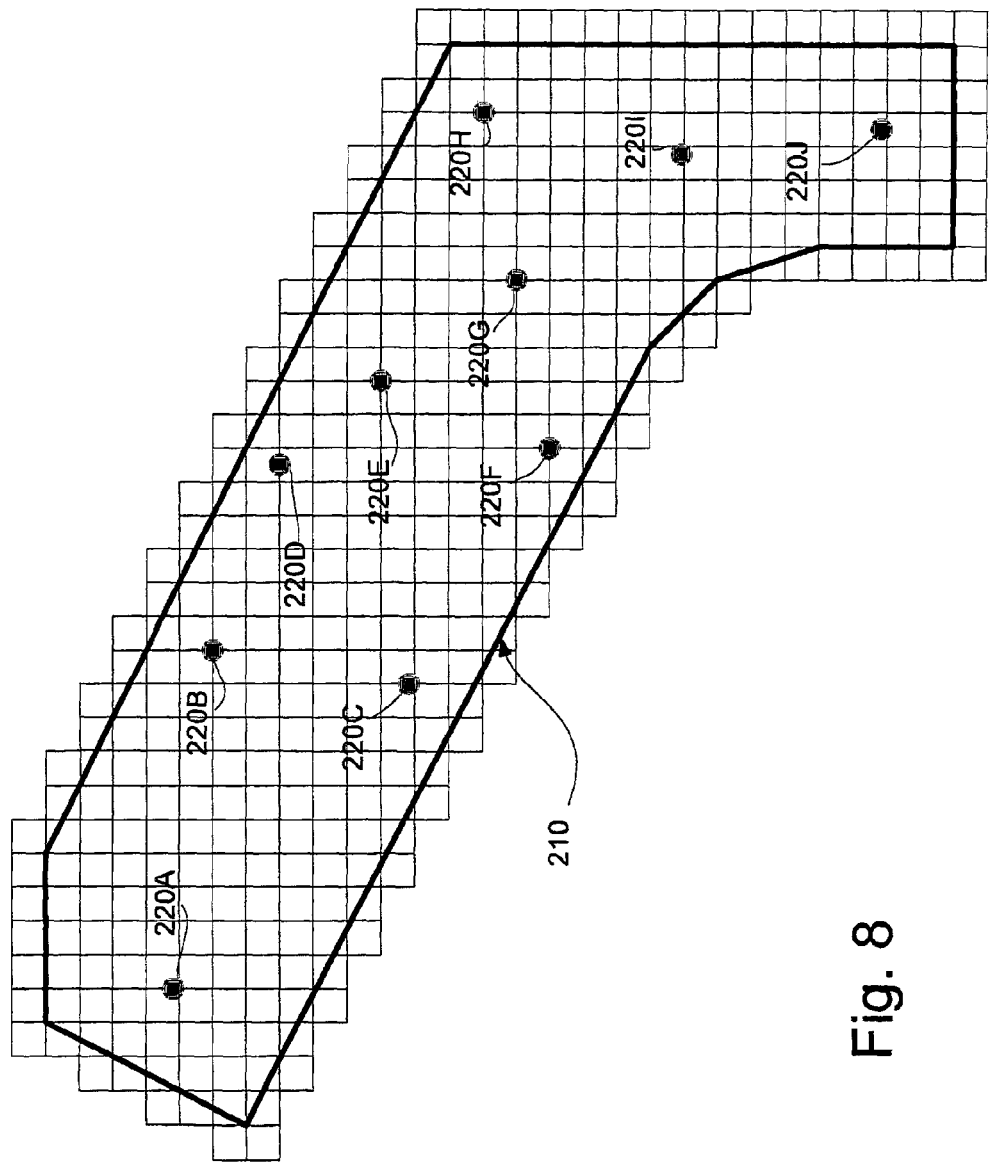
FIG. 8 illustrates a grid cell for the exemplary coverage area of FIG. 4.

The second model requires defining the coverage area and antenna locations. Referring to FIG. 4, the boundaries of the coverage area 210 are defined in a mathematical model and the location of the access points 220 are recorded at their locations within the model. Such a model may be based on longitude and latitude or may utilize its own coordinate system. In any case, the relative positions of the boundaries and access points are known. In order to statistically analyze the network performance criteria for the coverage area, the coverage area is subdivided into a grid, either regular or irregular. In any arrangement, a coordinate system of the coverage area may be divided into sub-areas or grid cells having predetermined areas. See FIG. 8. The distances between the centers of each grid cell 230 and each of the access points is calculated and utilized to determine an estimated path loss ($G_{PL}$) between each grid cell and each access point using the first model. This is more fully discussed herein.

The third model constitutes the estimated radiated power of the mobile device transmitters that will be utilized within the coverage area. For some applications, all mobile transmitters may be of a common design and this value may be known. In other applications, a mathematical estimate may be utilized that may represent, for instance, an average or mean value of the mobile transmitters that are expected to be utilized within the coverage area. For non-limiting purposes of discussion, this model or value is referred to as the mobile device equivalent isotropically radiated power or 'EIRP'.

Figure 9:
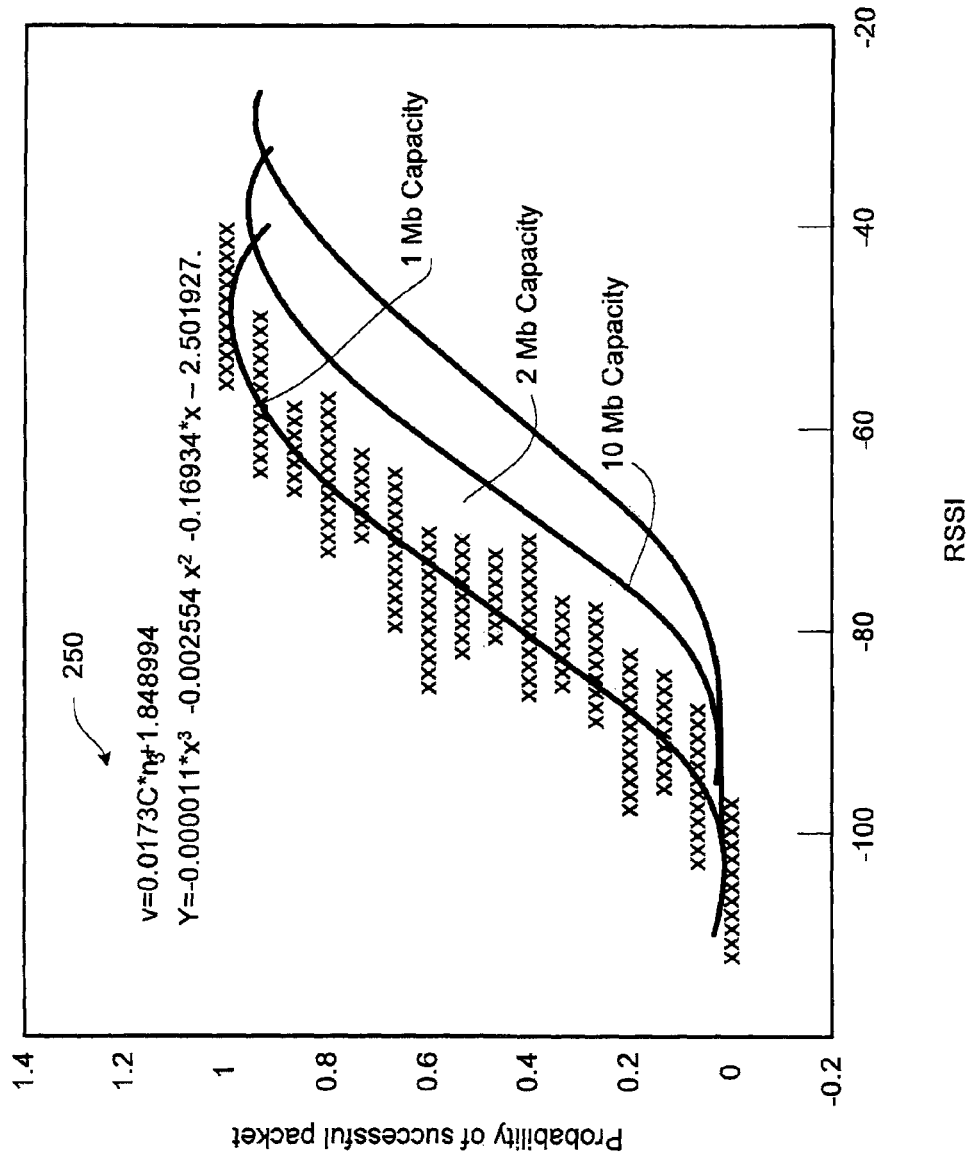
FIG. 9 illustrates a probability of successful transmission model.

The fourth model is a predictive model representing one or more network performance criteria. In one embodiment, the network performance criteria represents the probability of a packet being received as a function of signal strength, which is calculated from the third model based on the radiated power of the mobile devices to be utilized within the system. One non limiting example of a curve representing such a model is illustrated in FIG. 9. As illustrated, empirically determined test measurement were made to identify the probability of success for transmitting a signal based on a received signal strength indicator from a mobile transmitter. In another embodiment, the network performance criteria represents a data capacity of the network. In this embodiment, the data capacity of each location in a network is calculated as a function of, for example bit error rates, which are related to the Eb/No curve of a particular waveform as well as signal to noise ratio (SNR) of received signals. As shown in FIG. 9, various curves may be developed for different data capacities. In this regard, a combination of network performance criteria may be utilized. For instance, a probability of successful transfer for a specified data transfer rate/network capacity may be utilized. It will be appreciated that the curves illustrated in FIG. 9 may be defined by a mathematical equations 250 (only one shown) or look-up table such that if an estimated signal strength a of a mobile transmitter accounting for a path loss ($G_{PL}$) due to a distance between a transmitter and receiver is known, a probability of successful ($P_S$) transmission and/or data capacity can be estimated. If the model were to be adapted for cellular systems such as CDMA or LTE, rather than estimating RSSI as shown in FIG. 9, the model may be altered to estimate the carrier to interference ratio (C/I) and use that to estimate the bit error rate at each grid cell. Further, propagation models more configured to cellular systems may be implemented.

The fifth model is dependent upon the configuration of the adaptive antenna utilized by the access points. In this model, the beam patterns of the antenna relative to the weights and/or phases of the antennas are provided. That is, the models identify how a beam pattern for an adaptive antenna changes if one or more of the weights are adjusted. While information for each antenna may be known, the issues of how to make multiple antennas cooperatively provide more optimal coverage for an area remains.

Figure 10:
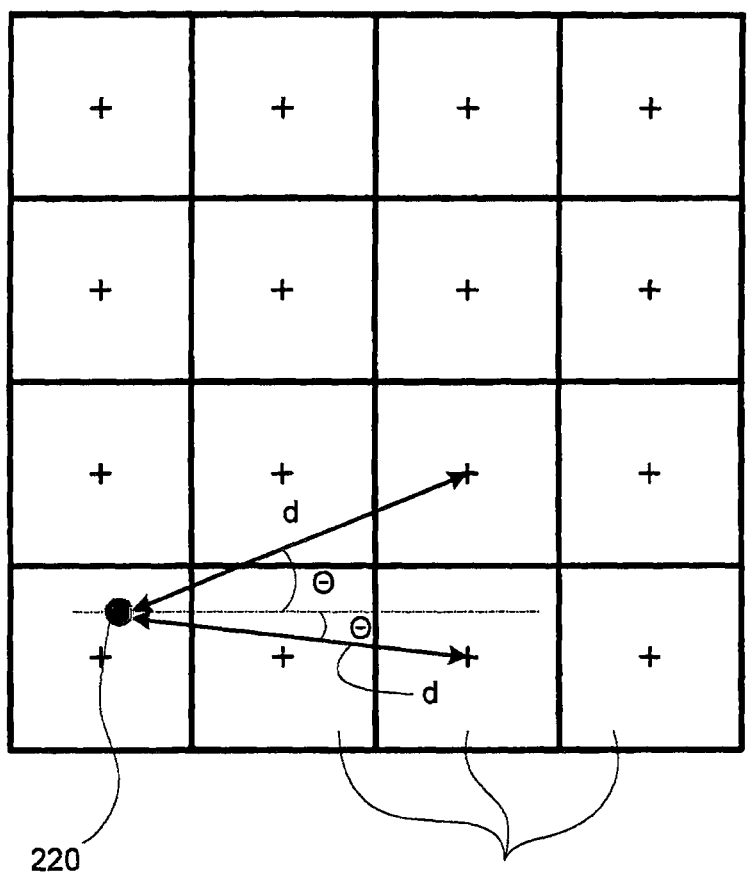
FIG. 10 illustrates calculation of distances and angles in an exemplary grid.

Once all of the models are generated, an optimization process is performed to adjust the weights of the individual antenna elements to enhance or optimize the coverage of the access points. The following discussion is set forth primarily in relation to the embodiment where the network performance criteria is calculated as the probability of successful transfer from any location within the coverage area. However, it will be appreciated that similar calculations may be performed based on one or more desired data capacities of the network and that the following is presented by way of example and not by way of limitation. This process starts by generating a new model that contains the following: 1) For each grid cell, a distance between each grid cell one or more antennas/access points and the path loss to one or more antenna; and 2) For each grid cell, the bearing angle from one or more antenna to that grid cell. This is illustrated in FIG. 10. As shown, the distance 'd' is calculated between each access point (only one shown for clarity) and the center of each grid cell (only two shown for clarity). The bearing angle θ (e.g., azimuth angle) is also calculated. Further, the altitude angle φ representing the elevation difference between the access point 220 and center of each grid cell may also be calculated. Path loss from the access point to each grid is then calculated:

$$G_{PL(x,y)} = \text{pathloss}(d_{x,y}) \quad \text{EQ. 1}$$

Where: $G_{PL}$ is the path loss, expressed as a gain (1/loss).
pathloss is the mathematical model that describes the path loss between the access point and the grid cell.
$d_{x,y}$ is the distance between the access point and the center of the grid cell.
$G_{pl}$ is expresses the path loss—the amount of attenuation the signal experiences propagating from the transmitter to the receiver, independent of the antennas involved. $G_{PL}$ will commonly express the propagation gain in linear units (watts/watts). It will be appreciated that $G_{PL}$ may be readily converted to a logarithmic, decibel scale using the familiar relationship $G_{PL}$ (dB)=10*log 10(Gpl). Alternatively, some mathematical models of $G_{PL}$ will include this relationship, in which case $G_{PL}$ will be naturally expressed in decibels.

Once the estimated path loss is determined for each grid cell 230, the probability that a packet will successfully be transmitted from each grid is calculated by first calculating for each grid cell, the signal to noise ratio of the signal received by each antenna:

$$SNR_{x,y} = P_{tx} + G_{tx} + G_{rx}(\theta,\phi) + G_{PL} - P_{noise} \quad \text{EQ. 2}$$

Where:
SNR is the signal to noise ratio at the grid cell, expressed in decibels
$P_{TX}$ is the transmit power, expressed in dBm
$G_{TX}$ is the antenna gain of the mobile unit, expressed in dBi
$G_{RX}$ is the antenna gain of the phased array in the direction of the grid cell, expressed in dBi.
$G_{PL}$ is the path loss from the phased array antenna to the grid cell
$P_{noise}$ is the noise power at the phased array, expressed in dBm It will be appreciated that the noise power may be estimated a variety of ways and that the $P_{noise}$ may encompass not just thermal noise, but also interfering signals. For example, it could be computed from the Johnson/Nyquist noise in the bandwidth of interest. In 2.4 GHz, 802.11 networks, a fixed value of −95 dBm is commonly assumed. In IS-95 CDMA networks, a fixed value of −104 dBm is commonly assumed. It will also be appreciated that if information is available about the location of interfering signals, the noise estimate may become a function of the antenna gain.

In the case of the network service being provided by a single access point, once the SNR is calculated for each grid cell, the probability of a packet being successfully transmitted by a mobile unit in a grid cell to a access point may be determined using the model that describes the probability of success vs. SNR (i.e. model #4):

$$P_{x,y} = P_s(SNR_{x,y}) \quad \text{EQ. 3}$$

Figure 11A:
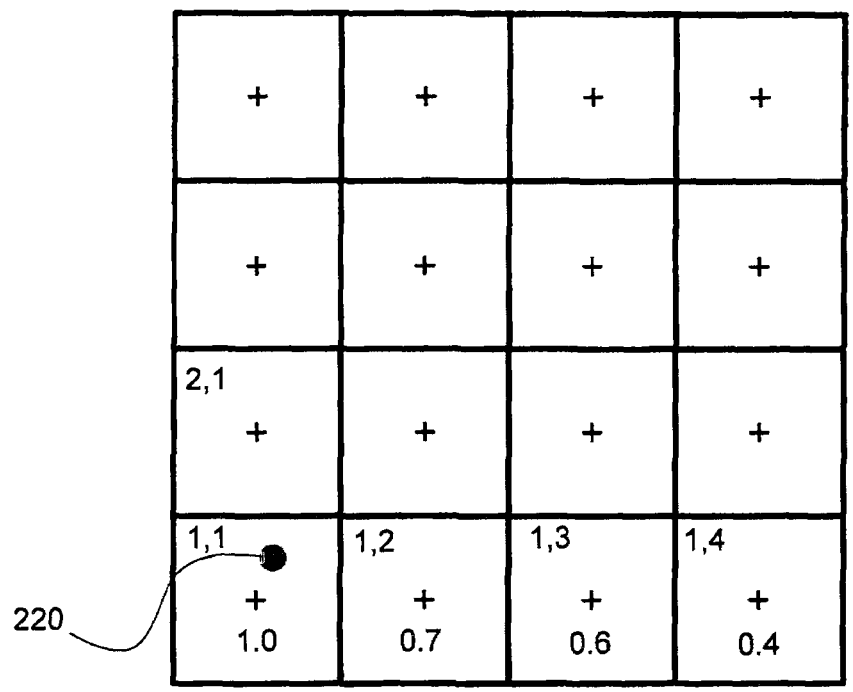
FIGS. 11A and 11B illustrate iterative calculation of probability of successful transmission for an exemplary grid.

This is illustrated for the bottom row of the grid cells 1,1-1,4 in FIG. 11A. Only the bottom row of cells is shown for purposed of illustration. In this exemplary embodiment, the probability of successful transmission decreases as the distance between the access point and each grid cell increases. The probabilities of successful transmission from each grid cell are then multiplied together to generate a joint probability that describes the overall probability of successfully receiving a packet transmitted from every cell in the coverage area:

$$P_{AoI} = \prod_{\text{all } x,y \text{ locations}} P_{x,y} \quad \text{EQ. 4}$$

Figure 11B:
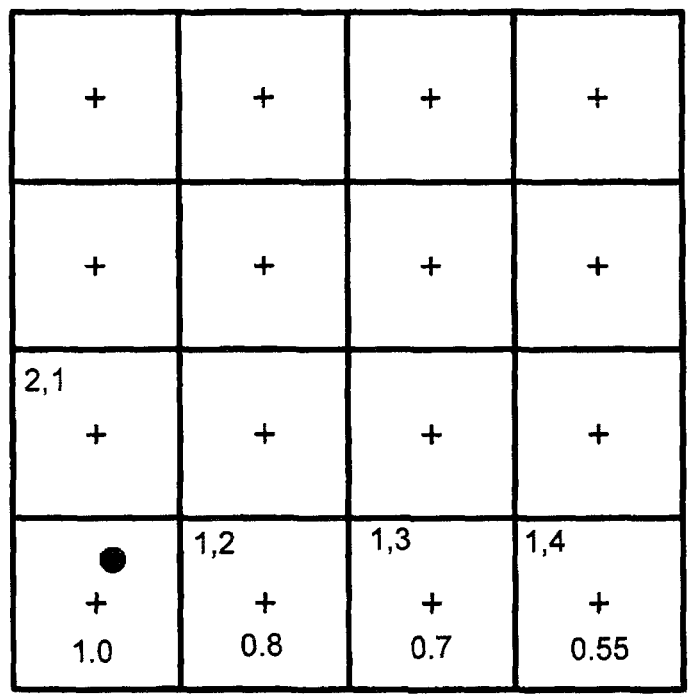

In the present embodiment, $P_{AoI}=1.0 \cdot 0.7 \cdot 0.6 \cdot 0.4=0.18$. In an embodiment with a single access point, a change may then be applied to one of the antenna elements of the adaptive antenna. Based on this change, the above calculations may be repeated in a second iteration as illustrated in FIG. 11B. In this iteration, $P_{AoI}=1.0 \cdot 0.8 \cdot 0.7 \cdot 0.55=0.308$. As can be seen this change to the antenna element weight improves the overall probability of success for the coverage area. This process may be repeated two or more times for each antenna element of the adaptive antenna. For instance, after an initial run (e.g., with default weights, such as those having an omni directional beam pattern) each antenna element may be adjusted up a predetermined amount and then down a predetermined amount. That is, for each antenna element the process includes increase the phase (or magnitude or both) of the beamformer weight applied to this element, on this antenna array. A typical value of phase change would be between 10 and 45 degrees, but any change is possible. For this change, the utility computes the overall probability of network success for this variation. Once computed, the utility decreases the phase of the beamformer weight applied to this element, on this antenna array. This phase change is generally equal and opposite to the increase selected above. Again the utility computes the overall probability of success for this variation. Once each antenna element in an array has been varied, the utility reviews the recorded probabilities of success and determines which one had the most favorable impact. This variation is selected and the weight associated with the most favorable variation is implemented for the corresponding element of the current antenna. That is, the largest $P_{AoI}$ value corresponds with the antenna weight that provides the largest improvement (e.g., most positive impact) to the probability of successfully transferring a packet from any location within the coverage area.

The entire process may start over again with the new weight being the initial weight of the adjusted antenna element. The process continues iteratively until the model converges (e.g., there is no further statistical improvement).

At the time of convergence, the antennas are set to the weights that define the beam pattern producing the best probability of successful transmission for the coverage area. That is, the beam pattern producing the best overall coverage is determined. In this current embodiment, the identification of an overall coverage of the area is reduced to a single number $P_{Aol}$ which facilitates the optimization of the beam pattern by a simple numerical comparison.

The foregoing description illustrated the case of a single access point covering an area. This process can be extended to include multiple access points covering an area of interest.

FIG. 12 illustrates the situation where multiple access points 220A and 220B provide overlapping coverage for a portion of a coverage area. In this example, as above, not all of the probability values are illustrated for purposes of clarity. However, it will be appreciated that these values are calculated for each cell of the grid. In this embodiment, the probability of success ($P_S$) values for access point 220B are underlined and the probability of success ($P_S$) values for access point 220A are without underline. As shown, the probability of success values of the two access points are higher nearer to each respective access point. Further, these access points 220A, 220B may each provide coverage to common grid cells. For instance, in grid cell 2,3 the first access point 22A has a probability of successful transmission of 0.5 and the second access points has a probability of successful transmission of 0.6. In this arrangement, what is desired is that the grid cell have the highest probability of successful transmission to one access point, not all access points. In this regard, as access point 220B provides better coverage to this cell, the beam pattern of access point 220A may be adjusted to reduce the coverage to this cell and potentially provide enhanced coverage elsewhere. The above-noted process for adjusting the weights of a single access point to generate an enhanced or optimized beam pattern is readily adaptable to the situation where multiple access points are available.

In the embodiment of FIG. 12, the path loss, SNR and probability of success ($P_S$) values are again calculated for each cell and for each access point. This time, however, the probability of success for each grid cell is computed slightly differently than it was previously. That is, it is desired to know the probability of successfully transmitting a packet from each grid cell to at least one access point while acknowledging that the packet may be received by more than one access point without error.

It is recognized that:

$$P_{success} = 1 - P_{fail} \quad \text{EQ. 5}$$

Where:
$P_{success}$ is the Probability of successfully getting a packet through in any attempt
$P_{fail}$ is the probability of not getting a packet through successfully Therefore, the probability of successfully getting a packet through on at least one access point is equal to one minus the probability of failing on all access points.

$$P_{x,y} = 1 - \prod_{n=all\ APs} (1 - P_n) \quad \text{EQ 6}$$

Where:
$P_n$ is the probability of successfully receiving a packet transmitted from location (x,y) at $AP_n$ $P_{x,y}$ is the overall probability of being able to receive the packet transmitted from location x,y on at least one AP.

In actuality, the mobile device would not transmit one packet that could be received by any of a plurality access points. In a real system, the mobile device would go through a complete association/registration procedure with the access point prior to sending the packet. Nonetheless, this mathematical model captures the essence of the concept that the mobile station has the opportunity to connect through different access points and some will be more reliable than others. Furthermore, this formulation describes the fact that if the mobile can connect reliably to at least one AP, $P_{x,y}$ will be higher than if it cannot reliably connect through any AP. In the mullet-access point embodiment, the utility is operative to automatically shift emphasis from those regions where there is good coverage because there is a high density of antennas to those regions where coverage is impaired due to scarcity of antennas. That is, if a region is being well covered by one antenna, the algorithm will pre-dispose neighboring antennas towards covering regions that are not being addressed by the first antenna. However, if all regions are being provided with basic coverage, then the algorithm attempts to provide redundant coverage.

Now with multiple Access Points, $P_{Aol}$ is computed using EQ 4, the same as before, but using the more sophisticated definition of $P_{x,y}$ given in EQ 6. This network success value can incorporate as many access points as exist in the network. For instance in FIGS. 4-6, the network has ten access points. In that particular embodiment, the $P_S$ for every grid cell in the network (See FIG. 8) would be calculated for every access point (i.e., ten sets). Accordingly, adjustment of the weights to optimize the beam patterns of the access points would include iteratively adjusting the weights of each antenna elements of each access point. For adaptive antennas having eight antenna elements, this would result in 161 iterations. For each iteration, the probability of network success is calculated and at the end of the iterations, the weight change resulting most favorable improvement may be selected and implemented and the process may be restarted until the model converges (i.e., until additional changes provide no further improvement). FIG. 6 illustrates a situation where fifty full iterations has resulted in simultaneous configuration of the beam patterns of the ten access points wherein coverage is provided to the coverage area and a reduced amount of coverage exists outside of the coverage area.

Figure 13:
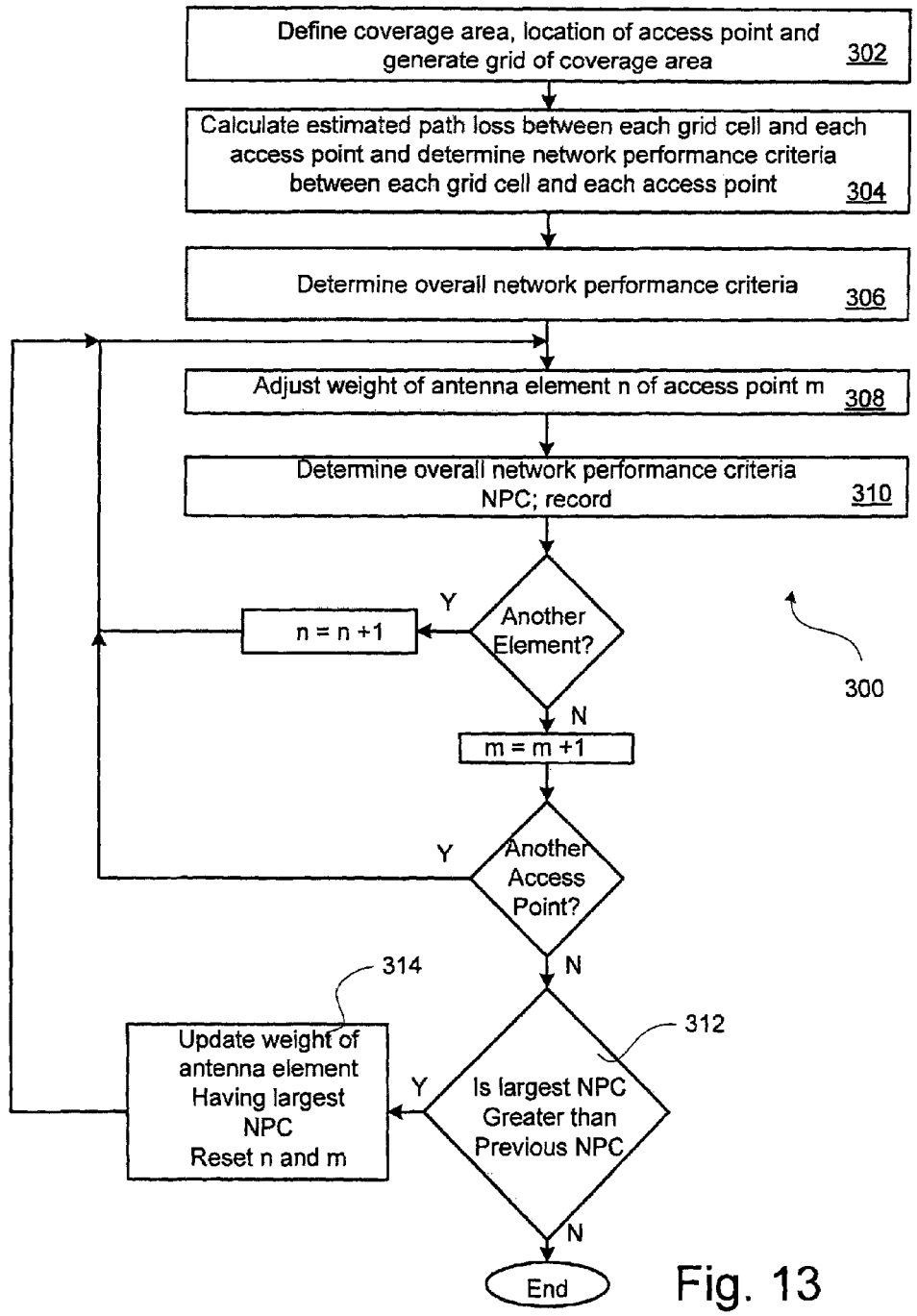
FIG. 13 illustrates an algorithm for use in synthesizing an antenna pattern for an adaptive antenna.

The overall process 300, which is typically implemented as computer-executable instructions of computer programs and software that run on computers is illustrated in FIG. 13. However, it will be appreciated that individual steps of the process may be performed on separate computers/servers and/or at separate times. Initially, the process includes defining 302 a coverage area and location of access points to define a grid of the coverage area. In this step, the physical relative positions (e.g., distances and/or elevations) of the grid cells, boundaries and access points are defined. Once the grid is defined 302, the process 300 estimates 304 the path loss and network performance criteria for each grid cell. Based on this information, the process determines 306 an initial overall network performance criteria for the network, which may include one or more adaptive antennas (e.g., access points). The process then begins an adaptive process of adjusting 308 the weight of each antenna element of each array and for each adjustment, determining 310 an overall network performance criteria for the network for that particular adjustment. Each network performance criteria is recorded. As noted above, each adjustment of each element may include first and second or multiple adjustments (e.g., up and down phase, up and down magnitude etc.). Once all iterations have been made, the process determines 312 if the best network performance criteria improvement (e.g., highest probability of network success or highest data capacity based on last full set of adjustments) is greater than the last network performance criteria. If so, the weight of the antenna element providing the improvement is updated 314 and the process continues. If the adjustments do not improve the network performance criteria or does not improve over a predetermined threshold, the model has converged and the process ends. Stated broadly, the process 300 allows for altering a base beam pattern of one or more access points to synthesize one or more individualized beam patterns based on the coverage(s) of one or more adjacent access points.

Figure 14:
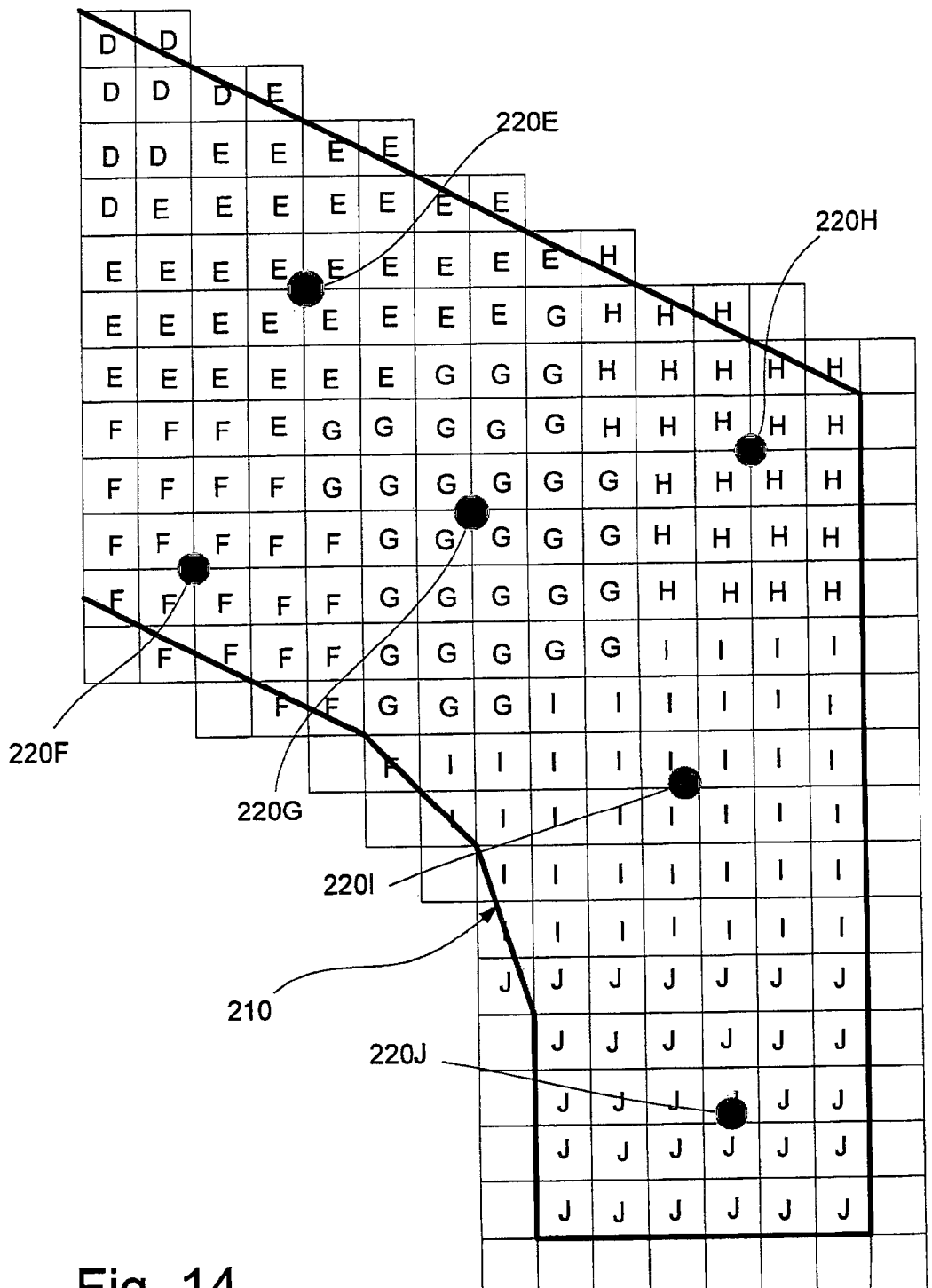
FIG. 14 illustrates a grid cell of a portion of the coverage area of FIG. 4.
Figure 15:
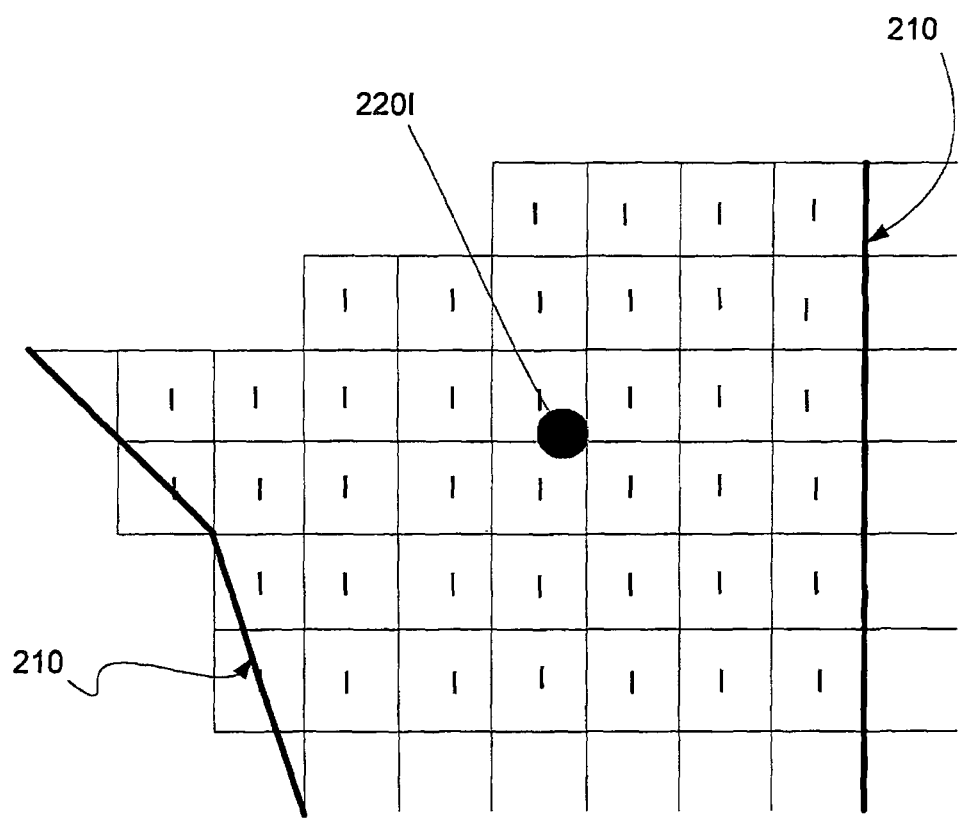
FIG. 15 illustrates an individual coverage area of an individual access point in the coverage area of FIG. 4.
Figure 16:
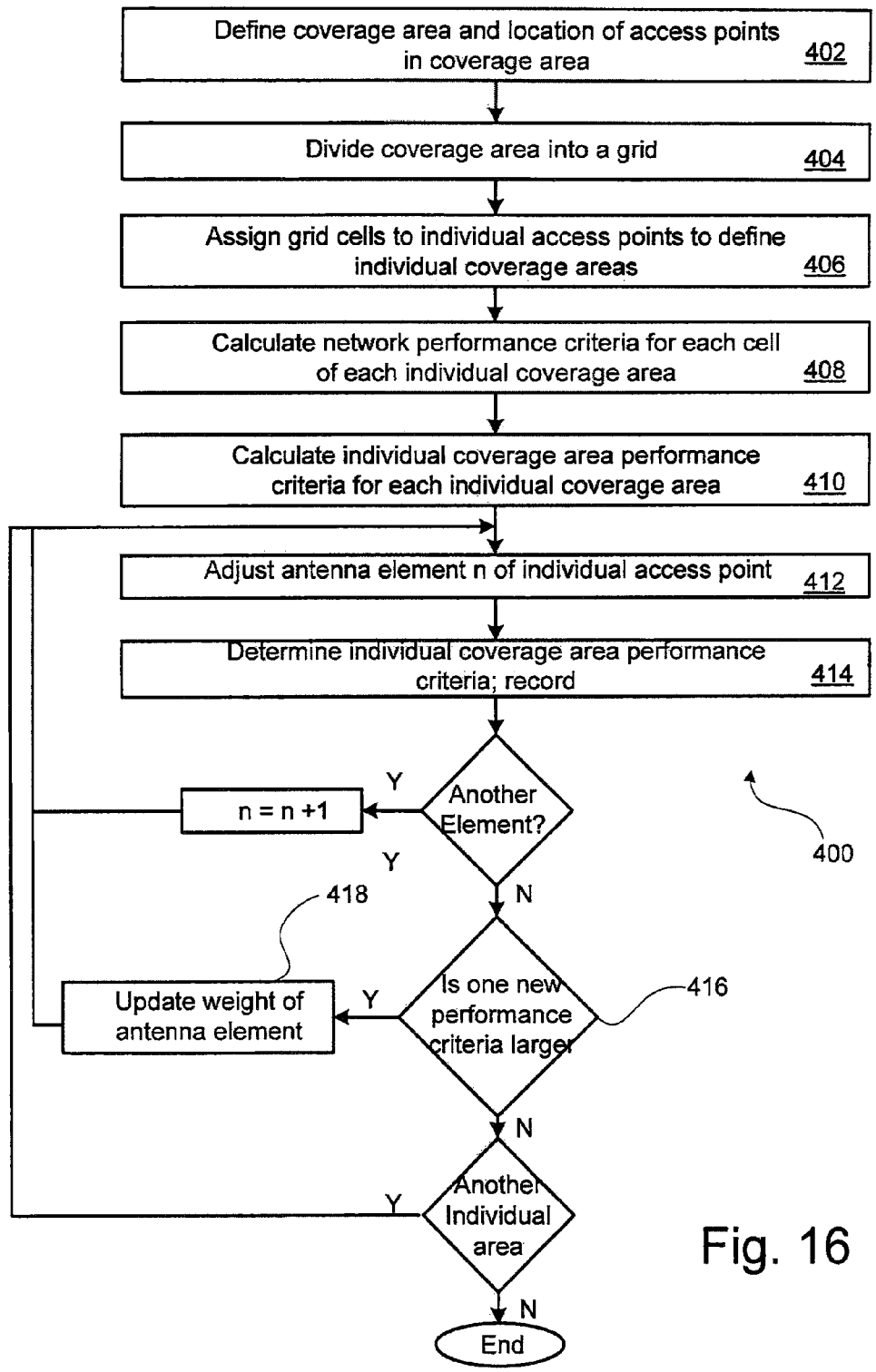
FIG. 16 illustrates an algorithm for use in synthesizing an individual antenna pattern for an individual coverage area.

The process described in FIG. 13 may be termed a global optimization process where probabilities of success or data capacities are calculated between each grid cell and each access point. FIGS. 14-16 illustrate a variation of the global optimization process where a local optimization process is utilized to define individual coverage areas for each of multiple access points and individually synthesize beam patterns for the individual access points.

As shown, FIG. 14 illustrates a portion of the coverage area 210 illustrated in FIG. 4. Included within this portion of the coverage area 210 are six access points 220E-220J. As described above, the coverage area 210 is geographically defined and divided into a grid having numerous individual cells or sub-areas. Instead of calculating a distance and path loss between each grid cell and each access point, each of the individual cells within the coverage area 210 is assigned to one of the access points 220E-220J. In the present embodiment, such assignment is performed based on the distance of each cell to its nearest access point. In other embodiments, other factors may be utilized to assign of individual cells to access point including, for example, elevation, foliage, urban canyons etc.

The assignment of the individual cells to an individual access point is illustrated in FIG. 14, where the assigned access point identifier (e.g., letter) is contained within each individual cell. Once each individual cell is assigned to an individual access point, an individual area of coverage for each access point is defined. FIG. 15 illustrates the individual cells of the coverage area 210 that are assigned to access point 220I. That is, FIG. 15 illustrates an individual coverage area 210I of access point 220I.

Once an individual coverage area is defined for an individual access point, a beam pattern may be synthesized for that access point based on its individual coverage area. In this regard, the above-noted processes may be implemented to generate a set of antenna weights or other adjustments that generate an antenna pattern specifically for the individual coverage area without concern of adjacent coverage areas. That is, synthesizing an individual pattern for each individual access point allows for optimizing the coverage within each individual coverage area. By individually synthesizing antenna patterns for each individual access point, improved network performance may be achieved for the overall coverage area.

A process 400 illustrating the localized optimization process of FIGS. 14 and 15 is set forth in FIG. 16. Initially, the process 400 includes defining a coverage area and the location of access points within the coverage area 402. The coverage area is tessellated into a grid 404. Individual grid cells are assigned to individual access points to define individual coverage areas 406. For each coverage area, a network performance criteria is calculated 408 for each grid cell of the individual coverage area. An individual coverage area performance criteria is then calculated 410 for the individual coverage area. For each individual access point, the process then begins an adaptive process of adjusting 412 each antenna element of the individual access point and for each adjustment, determining 414 an individual coverage area performance criteria for that particular adjustment. Each individual coverage area performance criteria is recorded. As noted above, each adjustment of each element may include first and second or multiple adjustments (e.g., up and down phase, up and down magnitude etc.). Once all iterations have been made, the process determines 416 if the largest individual coverage area performance criteria improvement (e.g., highest probability of network success or highest data capacity based on last full set of adjustments) is greater than the last individual coverage area performance criteria. If so, the weight of the antenna element providing the improvement is updated 418 and the process continues. If the adjustments do not improve the individual coverage area performance criteria or does not improve over a predetermined threshold, the model has converged and the process ends.

One significant variation alluded to above is that the model of signal propagation loss versus distance between the transmitter and receiver may be based on measured data rather a theoretical mathematical model. This is particularly significant in many large enterprise outdoor areas as the RF characteristics of such an area can differ substantially from free space theoretical models when the area has a large number of objects that either reflect or absorb RF energy. A model of signal propagation that is based on a large number of actual measurements within the specific area would be much more accurate than one that is based on free space theoretical models and would result in more useful patterns. This approach also leads itself to a process of continually measuring the RF environment within the area and adapting the patterns on an ongoing basis as the signal propagation characteristics of the area change over time.

The invention claimed is:

1. A computer implemented method for generating antennas beamformer weights for two or more adaptive antennas to provide coverage for a wireless network coverage area, comprising:

generating a coverage area computer model defining a physical wireless coverage area and physical locations of at least two adaptive antennas that provide wireless communications for said wireless coverage area wherein said physical coverage area is divided into a plurality of grid cells;

processing a network performance computer model and at least first and second adaptive antenna computer models of antenna beamformer weights that produce antenna beam patterns for each of said adaptive antennas, on a processing platform, to determine:

for each grid cell, a numerical probability of successful packet transfer to at least one of said adaptive antennas; and;

a network performance reference value calculated from a combination of said numerical probability of successful packet transfer for each of said grid cells and representing an overall probability of successful packet transfer from all said grid cells of said wireless coverage area to at least one of said adaptive antennas, wherein said network performance reference value is a numerical value;

iteratively adjusting beamformer weights of said adaptive antenna computer models; and for each iterative adjustment of said beamformer weights, reprocessing said network performance computer model with said first and second adaptive computer models to produce a single series of adjusted network performance values;

identifying when one of said single series of adjusted network performance values is greater than said network performance reference value;

when an identified one of said single series of adjusted network performance values is numerically greater than said network performance reference value, resetting at least one antenna beamformer weight of one of said antenna computer models to a beamformer weight that produced the identified one of said single series of adjusted network performance values;

generating an output of antenna beamformer weights based on said iterative adjustment, reprocessing, identifying and resetting steps; and setting said adaptive antennas to said output of antenna beamformer weights.

2. The method of claim 1, further comprising:

resetting the network performance reference value to said identified one of said single series of adjusted network performance values.

3. The method of claim 2, further comprising:

repeating said iteratively adjusting, reprocessing, and resetting steps until one of:

none of said single series of adjusted network performance values is greater than said network performance reference value; or none of said single series of adjusted network performance values is greater than said network performance reference value by more than a predetermined value.

4. The method of claim 1, wherein generating said coverage area computer model comprises:

geographically defining a coverage area of at least a portion of a physical wireless coverage area and physical locations of said adaptive antennas in said physical wireless coverage area.

5. The method of claim 4, further comprising:

generating a grid having multiple grid cells associated with said physical wireless coverage area, wherein at least one of a distance, angle and elevation between each grid cell and said adaptive antennas is determined.

6. The method of claim 1, wherein said steps of processing and reprocessing each further comprise:

determining a data capacity of signal transfer between said locations in said wireless coverage area and at least one of said adaptive antennas.

7. The method of claim 1, wherein said steps of processing and reprocessing further comprise:

estimating a path loss value between said locations in said wireless coverage area and at least one of said adaptive antennas.

8. The method of claim 1, wherein said adaptive antenna computer models comprise:

mathematical models of beam pattern formation based on a configuration of antenna elements of said adaptive antennas.

9. The method of claim 1, wherein said steps of processing and reprocessing further comprise:

computing a signal to noise ratio (SNR) for signals between said locations in said wireless coverage area and at least one of said adaptive antennas.

* * * * *